US00RE43302E

(19) United States
(12) Reissued Patent
Dickinson, III et al.

(10) Patent Number: US RE43,302 E
(45) Date of Reissued Patent: *Apr. 3, 2012

(54) E-MAIL FIREWALL WITH STORED KEY ENCRYPTION/DECRYPTION

(75) Inventors: Robert D. Dickinson, III, Redmond, WA (US); Sathvik Krishnamurthy, San Jose, CA (US)

(73) Assignee: Axway, Inc., Scottsdale, AZ (US)

( * ) Notice: This patent is subject to a terminal disclaimer.

(21) Appl. No.: 11/807,953

(22) Filed: May 29, 2007

Related U.S. Patent Documents

Reissue of:
(64) Patent No.: 7,162,738
Issued: Jan. 9, 2007
Appl. No.: 09/967,117
Filed: Sep. 29, 2001

U.S. Applications:
(63) Continuation of application No. 09/180,377, filed as application No. PCT/US98/15552 on Jul. 23, 1998, now Pat. No. 6,609,196.

(60) Provisional application No. 60/053,668, filed on Jul. 24, 1997.

(51) Int. Cl.
*G06F 9/00* (2006.01)

(52) U.S. Cl. ..... 726/14; 726/11; 713/152; 713/154; 713/156

(58) Field of Classification Search ..... 713/152, 713/154, 156, 170; 380/282, 30; 726/11, 726/14
See application file for complete search history.

(56) References Cited

U.S. PATENT DOCUMENTS
5,278,984 A 1/1994 Batchelor
(Continued)

FOREIGN PATENT DOCUMENTS
EP 0 420 779 A2 8/1990
(Continued)

OTHER PUBLICATIONS
Cate, Vincent, "Email-Firewalls"/Instant Corporate PGP, May 21, 1994, pp. 1-2.
(Continued)

*Primary Examiner* — Eleni Shiferaw
*Assistant Examiner* — Paul Callahan
(74) *Attorney, Agent, or Firm* — Zagorin O'Brien Graham, LLP

(57) ABSTRACT

An e-mail firewall (105) applies policies to e-mail messages (204) between a first site and a plurality of second sites in accordance with a plurality of administrator selectable policies (216). The firewall comprises a simple mail transfer protocol (SMTP) relay (202) for causing the e-mail messages (204) to be transmitted between the first site and selected ones of the second sites. A plurality of policy managers (216) enforce administrator selectable policies. The policies, such as encryption and decryption policies, comprise at least a first source/destination policy (218), at least a first content policy (202) and at least a first virus policy (224). The policies are characterized by a plurality of administrator selectable criteria (310), a plurality of administrator selectable exceptions (312) to the criteria and a plurality of administrator selectable actions (314, 316, 322) associated with the criteria and exceptions. The policy managers comprise an access manager (218) for restricting transmission of e-mail messages (204) between the first site and the second sites in accordance with the source/destination policy (218). The policy managers (216) further comprise a content manager (220) for restricting transmission of e-mail messages (204) between the first site and the second sites in accordance with the content policy (220), and a virus manager (224) for restriction transmission of e-mail messages (204) between the first site and the second sites in accordance with the virus policy (224).

8 Claims, 9 Drawing Sheets

U.S. PATENT DOCUMENTS

| | | | | |
|---|---|---|---|---|
| 5,283,856 | A | 2/1994 | Gross et al. | |
| 5,331,543 | A | 7/1994 | Yajima et al. | |
| 5,369,707 | A | 11/1994 | Follendore, III | |
| 5,377,354 | A | 12/1994 | Scannell et al. | |
| 5,406,557 | A | 4/1995 | Baudoin | |
| 5,414,833 | A * | 5/1995 | Hershey | 395/575 |
| 5,416,842 | A * | 5/1995 | Aziz | 380/30 |
| 5,530,758 | A | 6/1996 | Marino, Jr. et al. | |
| 5,555,346 | A | 9/1996 | Gross et al. | |
| 5,577,202 | A | 11/1996 | Padgett | |
| 5,606,668 | A | 2/1997 | Shwed | |
| 5,619,648 | A | 4/1997 | Canale et al. | |
| 5,623,600 | A | 4/1997 | Ji et al. | |
| 5,627,764 | A | 5/1997 | Schutzman et al. | |
| 5,632,011 | A | 5/1997 | Landfield et al. | |
| 5,634,005 | A | 5/1997 | Matsuo | |
| 5,740,231 | A | 4/1998 | Cohn et al. | |
| 5,748,738 | A | 5/1998 | Bisbee et al. | |
| 5,748,884 | A | 5/1998 | Royce et al. | |
| 5,778,174 | A | 7/1998 | Cain | |
| 5,796,948 | A | 8/1998 | Cohen | |
| 5,802,253 | A | 9/1998 | Gross et al. | |
| 5,826,023 | A | 10/1998 | Hall et al. | |
| 5,828,893 | A | 10/1998 | Wied et al. | |
| 5,832,208 | A | 11/1998 | Chen et al. | |
| 5,835,594 | A | 11/1998 | Albrecht et al. | |
| 5,835,726 | A | 11/1998 | Shwed et al. | |
| 5,848,415 | A | 12/1998 | Guck | |
| 5,864,683 | A | 1/1999 | Boebert et al. | |
| 5,889,943 | A | 3/1999 | Ji et al. | |
| 5,905,777 | A | 5/1999 | Foladare et al. | |
| 5,909,493 | A | 6/1999 | Motoyama | |
| 5,915,024 | A | 6/1999 | Kitaori et al. | |
| 5,978,484 | A * | 11/1999 | Apperson et al. | 705/54 |
| 5,983,350 | A | 11/1999 | Minear et al. | |
| 6,072,942 | A | 6/2000 | Stockwell et al. | |
| 6,073,142 | A | 6/2000 | Geiger et al. | |
| 6,092,101 | A | 7/2000 | Birrell et al. | |
| 6,154,840 | A | 11/2000 | Pebley et al. | |
| 6,161,181 | A * | 12/2000 | Haynes et al. | 713/170 |
| 6,182,118 | B1 | 1/2001 | Finney et al. | |
| 6,237,096 | B1 | 5/2001 | Bisbee et al. | |
| 6,324,648 | B1 | 11/2001 | Grantges, Jr. | |
| 6,336,186 | B1 | 1/2002 | Dyksterhouse et al. | |
| 6,385,655 | B1 | 5/2002 | Smith et al. | |
| 6,393,568 | B1 | 5/2002 | Ranger et al. | |
| 6,424,718 | B1 | 7/2002 | Holloway | |
| 6,584,563 | B1 | 6/2003 | Kikuchi et al. | |
| 6,609,196 | B1 | 8/2003 | Dickinson et al. | |
| 6,651,166 | B1 | 11/2003 | Smith et al. | |
| 6,853,988 | B1 | 2/2005 | Dickinson et al. | |
| 7,096,497 | B2 | 8/2006 | Ellison et al. | |
| 7,117,358 | B2 | 10/2006 | Bandini et al. | |
| 7,127,741 | B2 | 10/2006 | Bandini et al. | |
| 2001/0039615 | A1 | 11/2001 | Bowker et al. | |
| 2003/0051142 | A1 | 3/2003 | Hidalgo et al. | |
| 2003/0167402 | A1 * | 9/2003 | Stolfo et al. | 713/200 |
| 2003/0196098 | A1 | 10/2003 | Dickinson, III et al. | |

FOREIGN PATENT DOCUMENTS

| | | | |
|---|---|---|---|
| EP | 0 680 187 | A3 | 3/1995 |
| EP | 2318486 | | 3/1995 |
| JP | A 3-117940 | | 5/1991 |
| JP | A 5-207029 | | 8/1993 |
| JP | A 6-276221 | | 9/1994 |
| JP | A 7-107082 | | 4/1995 |
| JP | A 8-204701 | | 8/1996 |
| JP | A 8-251156 | | 9/1996 |
| JP | A 8-263404 | | 10/1996 |
| JP | 9-252294 | A | 9/1997 |
| JP | A 9-252294 | | 9/1997 |
| JP | 10-504168 | | 4/1998 |
| JP | 2000-515332 | | 11/2000 |
| JP | 2001-505371 | | 2/2001 |
| WO | WO96/35994 | | 11/1996 |
| WO | WO97/00471 | | 1/1997 |
| WO | WO97/24825 | | 7/1997 |
| WO | WO 99/05814 | | 2/1999 |

OTHER PUBLICATIONS

Integralis Asia Pacific, "Total Email Content Management Countering Email Borne Threats," White Paper MIMIsweeper, Jan. 1996, pp. 1-12.

Press Release, Integralis releases MIMEsweeper Version 2.0 with SMTP mail security support, Jan. 15, 1996 (document apparently received from 3rd Party and apparently printed Jun. 8, 2004), 2 pages.

Press Release, Integralis announces version 2.3 of MIMEsweeper with new email security features, Jun. 13, 1996 (document apparently received from 3rd Party and apparently printed Jun. 8, 2004), 2 pages.

Author unknown, 3rd party search of internet archive (2 pages) and printouts (31 pages), apparently representing content archived from http://www.nha.com circa Nov. 12, 1996. Printouts include pages apparently descriptive of a MIMEsweeper (documents apparently received from 3rd Party and apparently printed Jun. 8, 2004), 33 pages.

S. Kent, Privacy Enhancement for Internet Electronic Mail: Part II: Certificate-Based Key Management, Network Working Group, Request for Comments 1422, Feb. 1993, pp. 1-33.

Costales, Bryan and Allman, Eric, "Help for UNIX System Administrators," Sendmail, 2nd Edition, O'Reilly & Associates (1997), Ch. 20, pp. 285-302 (received from 3rd party).

Costales, Bryan and Allman, Eric, "Building, Installing, and Administering Sendmail," Sendmail, 3rd Edition, O'Reilly & Associates (2002), Appendix D, pp. 1161-1172 (received from 3rd party).

Trend Micro, Inc. "Antivirus.com—Press Releases", May 14, 1997, pp. 1-2.

Key Recovery Alliance "Business Requirement for Key Recovery Draft 2.1", Sep. 4, 1997, pp. 1-16.

Check Point Software Technologies, Ltd. "Internet Security gets Less Costly and Easier to Manage", Sep. 16, 1996, pp. 1-2.

Check Point Software Technologies, Ltd. "Check Point Enables Secure Business Over the Internet with FireWall-1 2.0", Sep. 18, 1995, pp. 1-3.

Check Point Software Technologies, Ltd. "Check Point FireWall-1 3.0 Awarded Best of Show at NetWorld+Interop Paris", Oct. 14, 1996, pp. 1-2.

Check Point Software Product Information "understanding Check Point Products", pp. 1-2, publication date unknown, received from third party on Feb. 26, 2009.

Check Point Software Technologies, Ltd. "Check Point Software Delivers Breakthrough Security Advancements with FireWall-1 3.0", Oct. 7, 1996, pp. 1-4.

Check Point Software Technologies, Ltd. "Check Point Software Unveils FireWall-1 Version 2.1", Jun. 17, 1996, pp. 1-3.

Check Point Software Technologies, Ltd. "Check Point Software Technologies Ltd. Awarded Patent for Stateful Inspection Technology", Mar. 17, 1997, 1 page.

Check Point Software Technologies, Ltd. "Integralis Announces OPSEC-complaint MIMEsweeper for FireWall-1 ", Apr. 28, 1997, pp. 1-2.

CheckPoint—FireWall-1 "FireWall-1 version 2.1", 7 pages, publication date unknown, received from third party on Feb. 26, 2009.

Check Point Software "Check Point FireWall-1—Introduction", Mar. 1997, pp. 1-2.

Check Point Software "Check Point FireWall-1 Release 3.0", 1 page, publication date unknown, received from third party on Feb. 26, 2009.

Check Point Software "Check Point FireWall-1 Version 3.0 Highlights", pp. 1-3, publication date unknown, received from third party on Feb. 26, 2009.

Check Point Software Technologies, Ltd. "Check Point FireWall-1™ White Paper", Version 3.0, Jun. 1997, pp. 1-34.

Dunlap, C., "Worldtalk to deliver E-Mail Firewall", Computer Reseller News, Jun. 16, 1997, 1 page.

Machlis, S., Computerworld "Check Point makes firewall security's Grand Central", Apr. 21, 1997, 1 page.

MIMEsweeper "Configuring MAILsweeper for SMTP", pp. 1-4, publication date unknown, received from third party on Feb. 26, 2009.
ConnectSoft Inc. "ConnectSoft Ships S/MIME Compliant Email Connection 3.1", Oct. 4, 1996, 1 page.
Trend Micro Inc. "Trend Micro Sues Integralis for Gateway Anti-VirusPatent Infringement", Jul. 8, 1997, pp. 1-2.
RSA Encryption Inc. "Data Security, Inc. Pressbox", Nov. 1996, pp. 1-7.
Deming Software "Secure Messenger™", pp. 1-3, publication date unknown, received from third party on Feb. 26, 2009.
Rodriguez, K., Deming Software "Secure Mail Spec Gets Boost—Secure MIME will soon see broad industry support", Apr. 8, 1996, pp. 1-2.
Deming Software "Deming Internet Security", Nov. 1996, 1 page.
Deming Software "Deming Software Announces Secure E-mail Solution for QUALCOMM's Eudora Pro 3.0 at EMA '96", Apr. 30, 1996, pp. 1-2.
Deming Software Inc. "Deming Software Licenses Technology firm RSA Data Security for Secure E-mail Product and Developers' Toolkit", Apr. 2, 1996, pp. 1-2.
Deming Software "Press Box— Press Release", 1996, 1 page.
Deming Software, Inc. Deming Software Announces Secure E-mail Solution for Microsoft Exchange at Networld+Interop, Apr. 2, 1996, pp. 1-2.
RSA Data Security Inc. "Develop industry-standard secure, interoperable electronic mail applications", pp. 1-3, publication date unknown, received from third party on Feb. 26, 2009.
Fontana, J., "WorldTalk Secures E-Mail Servers", CommunicationsWeek, Jun. 30, 1997, pp. 1-2.
MIMEsweeper "Evaluating Email Anti-Virus Solutions", pp. 1-4, publication date unknown, received from third party on Feb. 26, 2009.
Check Point "FireWall-1 Access Control", pp. 1-5, publication date unknown, received from third party on Feb. 26, 2009.
Check Point "FireWall-1 Content Security", pp. 1-4, publication date unknown, received from third party on Feb. 26, 2009.
Check Point "FireWall-1 Supported Applications", pp. 1-5, publication date unknown, received from third party on Feb. 26, 2009.
Check Point Home Page "Table of Contents", pp. 1-6, publication date unknown, received from third party on Feb. 26, 2009.
Check Point "What's in the News?", pp. 1-3, publication date unknown, received from third party on Feb. 26, 2009.
NHA "Lexical Analysis in MIMEsweeper", pp. 1-4, publication date unknown, received from third party on Feb. 26, 2009.
GlobalKey Inc. "GlobalKey's Suite of Products and Services", pp. 1-3, publication date unknown, received from third party on Feb. 26, 2009.
GlobalKey Inc. "GlobalKey Secure E-Mail Plus", pp. 1-2, publication date unknown, received from third party on Feb. 26, 2009.
Wingfield, N., "Checkpoint Software touts FireWall-1 for VPNs", InfoWorld, Sep. 25, 1995, p. 71.
Carreon, J., "Product Overview", InfoWorld , Jul. 29, 1996, p. 74.
Antivirus "InterScan E-Mail Virus Wall™", pp. 1-2, publication date unknown, received from third party on Feb. 26, 2009.
Canter, S. "internet E-Mail encryption", Apr. 8, 1997, PC Magazine, 5 pages.
Business Wire "Internet Security gets Less Costly and Easier to Manage: Integralis Announces MIMEsweeper Compatible with Check Point FireWall-1 on Single NT Server; E-mail virus detection and content management can reside on Firewall server, saving money and support costs", Sep. 16, 1996, pp. 1-3.
Antivirus "InterScan Virus Wall™ The Internet Anti-Virus Security Suite", pp. 1-2, publication date unknown, received from third party on Feb. 26, 2009.
Schaff, W. "Commercial Firewalls—A Burning Commodity", InformationWeek ,Dec. 9, 1996, p. 120.
Check Point Software Technologies Ltd. "Leading Content Security Vendors Announce Support for Check Point FireWall-1 3.0", Oct. 7, 1996, pp. 1-3.
Integralis Ltd. "Administrator's Guide Version 3.1", 1997, pp. 1-3, publication date unknown, received from third party on Feb. 26, 2009.
MIMEsweeper "5 Content security—Table of Contents", pp. 1-3, publication date unknown, received from third party on Feb. 26, 2009.
MIMEsweeper "6 Management—Table of Contents", pp. 1-2, publication date unknown, received from third party on Feb. 26, 2009.
MIMEsweeper "MAILsweeper Table of Contents", pp. 1-6, publication date unknown, received from third party on Feb. 26, 2009.
MIMEsweeper 2.0 Press Release "Integralis releases MIMEsweeper Version 2.0 with SMTP mail security support", Jan. 15, 1996, pp. 1-2.
MIMEsweeper "MIMEsweeper Table of Contents", pp. 1-3, publication date unknown, received from third party on Feb. 26, 2009.
MIMEsweeper "MIMEsweeper Downloads", 1 page, publication date unknown, received from third party on Feb. 26, 2009.
NHA "Frequently Asked Questions", pp. 1-3, publication date unknown, received from third party on Feb. 26, 2009.
MIMEsweeper "MIMEsweeper Review Business Computer World—How can you protect against viruses?", Dec. 1996, pp. 1-2.
MIMEsweeper "MIMEsweeper Review PC User—Combat e-mail viruses and spies", Oct. 1996, pp. 1-2.
MIMEsweeper "MIMEsweeper Review Secure Computing—MIMEsweeper—Secure Computing's Editor's Choice", Sep. 1996, pp. 1-2.
MIMEsweeper "MIMEsweeper Frequently Asked Technical Questions", pp. 1-2, publication date unknown, received from third party on Feb. 26, 2009.
Deming Software "Message Security Plug-in For Eudora Pro™ 3.0 Available Online From Deming Software", Oct. 15, 1996, pp. 1-2.
NH&A anti-virus, security & network management "Who we are", pp. 1-5, publication date unknown, received from third party on Feb. 26, 2009.
Messmer, E. "Check Point adds fuel to firewall", Network World, Oct. 28, 1996, p. 37.
Messmer, E. "Intranets & the 'Firewall 'checks' out ODBC data", Network World, Nov. 25, 1996, p. 33.
OpenSoft Corporation "Now you can safely order online!", Dec. 31, 1996, pp. 1-2.
OpenSoft "OpenSoft ExpressMail 32-bit client", pp. 1-2, publication date unknown, received from third party on Feb. 26, 2009.
OpenSoft "OpenSoft ExpressMail (tm) Server High Performance Internet Messaging Server", pp. 1-3, publication date unknown, received from third party on Feb. 26, 2009.
OpenSoft "OpenSoft Certificate Server Massively Scalable Certificate Distribution System for the Internet", pp. 1-2, publication date unknown, received from third party on Feb. 26, 2009.
OpenSoft "OpenSoft ExpressMail User Manual Running ExpressMail Server", pp. 1-4, publication date unknown, received from third party on Feb. 26, 2009.
OpenSoft "OpenSoft ExpressMail User Manual Setting Up ExpressMail Server", pp. 1-2, publication date unknown, received from third party on Feb. 26, 2009.
OpenSoft "OpenSoft ExpressMail User Manual Server Administrator's Guide Table of Contents", pp. 1-2, publication date unknown, received from third party on Feb. 26, 2009.
OpenSoft "OpenSoft ExpressMail User Manual Client User's Guide Table of Contents", pp. 1-3, publication date unknown, received from third party on Feb. 26, 2009.
Avolio, F., and Ranum, M. "A Network Perimeter with Secure External Access", Trusted Information Systems, Inc., Symposium on Network and Distributed System Security, Feb. 2-4, 1994, pp. 109-119.
RSA "Ciphertext, the RSA Newsletter", vol. 3, No. 1, Fall 1995, pp. 1-8.
Dusse, S. and Matthews, T. "S/MIME: Anatomy of a Secure E-mail Standard", RSA Data Security, Inc., pp. 1-4, publication date unknown, received from third party on Feb. 26, 2009.
RSA "S/MIME Central General Information", pp. 1-3, publication date unknown, received from third party on Feb. 26, 2009.
Deming "S/MIME Keys", 1 page, publication date unknown, received from third party on Feb. 26, 2009.
ConnectSoft Inc. "S/MIME Arrives! ConnectSoft E-Mail Connection 3.0 Ships", May 14, 1996, pp. 1-2.
Trend Micro Inc. "ScanMail & the Epidemiology of E-mail Virus Outbreaks", Mar. 30, 1996, pp. 1-4.

Trend Micro Inc. "ScanMail for cc:Mail, a client-side virus protection software that detects and cleans viruses attached to e-mail messages Product Specification", pp. 1-4, publication date unknown, received from third party on Feb. 26, 2009.
Trend Micro "ScanMail for Lotus Notes—Keeps viruses out of your Lotus Notes environment", pp. 1-3, publication date unknown, received from third party on Feb. 26, 2009.
Antivirus.com "ScanMail™ for Microsoft Exchange Server", pp. 1-2, publication date unknown, received from third party on Feb. 26, 2009.
Deming Screen Shots "Secure Messenger Screen Shots", pp. 1-2, publication date unknown, received from third party on Feb. 26, 2009.
Integralis UK "Security Solutions Index", 1 page, publication date unknown, received from third party on Feb. 26, 2009.
NHA "MIMEsweeper 'Online' SPD", pp. 1-9, publication date unknown, received from third party on Feb. 26, 2009.
Gaines, B. "Supporting Collaboration through Multimedia Digital Document Archives", Version 1.0, Nov. 1994, pp. 1-53.
Trend Micro Press Release "Trend Micro Announces Virus Protection for Microsoft Exchange Server", Nov. 6, 1996, pp. 1-2.
Trend Micro, Inc. "Anti-Virus for the Enterprise, Corporate Overview—Company profile", pp. 1-2, publication date unknown, received from third party on Feb. 26, 2009.
Trend Micro, Inc. "Antivirus, About Trend—Analyst", pp. 1-3, publication date unknown, received from third party on Feb. 26, 2009.
Deming Acquisition "Worldtalk Acquires Deming Software Internet Mail Security Software Developer", Nov. 11, 1996, 1 page.
Worldtalk Press Release "Worldtalk to Acquire Deming Software", Nov. 12, 1996, pp. 1-3.
McNamara, P. "Worldtalk tool to thwart e-mail threats", Network World, Jun. 23, 1997, p. 47.
Integralis Technology Ltd. "For FireWall-1 Administrator's Guide Version 1.0", Revision 1.0, 1997, pp. 1-3.
Exclusive ProLiant 5000, Oct. 20-Nov. 12, 1996; 1 page.
New Products-MIMEsweeper 2.3-2, "Combat e-mail viruses and spies", Oct. 30-Nov. 12, 1996; 1 page.
MIMEsweeper "Email Content Management and Control", pp. 1-4, publication date unknown, received from third party on Feb. 26, 2009.
Content Security White Paper "A Discussion of content based threats from the Internet and other internal and public networks", pp. 1-17, publication date unknown, received from third party on Feb. 26, 2009.
Trend Micro Incorporated "Viruses and E-mail", Jun. 1996, pp. 1-22.
Antivirus.Com: Press Releases "Press Releases", May 14, 1997, pp. 1-2.
Network Associates Product—Security "PGP Enterprise Security Suite", pp. 1-11, publication date unknown, received from third party on Feb. 26, 2009.
OpenSoft ExpressMail User Manual "Server Configuration", pp. 1-14, publication date unknown, received from third party on Feb. 26, 2009.
Press Release "OpenSoft and VeriSign Announce Strategic Partnership to Provide Customers with S/MIME Solution", Apr. 22, 1996, pp. 1-2.
S/MIME Arrives! ConnectSoft E-Mail Connection 3.0 Ships, May 14, 1996, pp. 1-2.
Exclusive: Shogun SMP server, Sep. 6-19, 1995 (obtained from National Research Council Canada facsimile dated Oct. 15, 2008) 4 pages.
WebShield "Secure Internet Gateway Virus Protection", pp. 1-5, publication date unknown, received from third party on Feb. 26, 2009.
Technical FAQ's "Updates and Patches", 3 pages, publication date unknown, received from third party on Feb. 26, 2009.
Technical FAQ "Technical Note—How can MAILsweeper inform multiple addresses?", 1 page, publication date unknown, received from third party on Feb. 26, 2009.
"GlobalKey Chooses RSA Technology to Secure First Real-Time Communications Environment", Jun. 10, 1996, pp. 1-3.
WebShield "Secuire Internet Gateway Virus Protection", pp. 1-5, publication date unknown, received from third party on Feb. 26, 2009.
Deming Software-Press Release "Deming Software Licenses Technology from RSA Data Security for Secure E-mail Product and Developers' Toolkit", Apr. 2, 1996, 2 pages.
"Enterprise solutions Announces RSA Mail", Jan. 12, 1994, pp. 1-2.
Costales, B. with Allman, E., "sendmail Second Edition", 1997, 1993 O'Reilly & Associates, Inc., Table of Contents & Chapter 20 only, 31 pages.
Check Point FireWall-1™ White Paper, Version 3.0, Jan. 1997, pp. 1-47.
Integralis White Paper MIMEsweeper Total Email Content Management Counting Email borne threats, Jan. 1996, pp. 1-12.
National Software Testing Laboratories "NSTL Final Report for Trend Micro Incorporated Comparison Testing of Anti-Virus Products", Jun. 1997, pp. 1-13.
OpenSoft Corporation "OpenSoft and VeriSign Announce Strategic Partnership to Provide Customers With S/MIME Solution", Apr. 22, 1996, pp. 1-2.
Gale Group Computer Product Announcement "Anti-virus-Intel meets virus challenge, lowers total cost of PC networks", Nov. 18, 2006; 2 pages.
Gale Group Computer Evaluation "Four anti-virus products get the bugs out", Oct. 6, 1997, pp. 1-7.
Crocker, D, "Standard for the Format of ARPA Internet Text Messages", Dept. of Electrical Engineering, University of Delaware, Newark, Aug. 13, 1982; pp. 1-99.
Notice of Opposition filed in EP 1750384 on Jun. 25, 2010, 255 pages.
Bruce Schneier: Applied Cryptography 2nd Edition, John Wiley & Sons Pub., Oct. 1995 pp. 31-33 and 185-187.*
MIMEsweeper, Total Email Content Management Countering Email Borne Threats, White Paper Jan. 1996.
Emergency Employment of Army and Other Resources—Emergency Operations Center Standard Operating Procedures (HQUSACE-EOCSO), OM 500-1-5, Appendix C, 1994.
Serenelli, Bob and Leisher, Tim, Securing Electronic Mail Systems, MILCOM 92, 677-680, 1992.
Smith, Randal, E., A Secure Email Gateway, Computer Service Applications 10th Annual Conference, 202-211, 1994.
Cheswick, W.R. and Bellovin, S.M., Firewalls and Internet Security-Repelling the Wily Hacker, (Addison Wesley 1st ed.), 1994.
Smith, Richard E., Constructing a High Assurance Mail Guard, Secure Computing, San Jose, California, 1994.
Integralis Announces MIMEsweeper Compatible with Check Point FireWall-1 on Single NT Server, Kirlkland, WA Sep. 16, 1996.
Levien, Ralph, Protecting Internet E-Mail From Prying Eyes, Data Communications, May 1996, pp. 117-126.
Pollock, Stephen, A Rule-Based Message Filtering System, ACM Transactions on Office Information Systems, vol. 6, No. 3, Jul. 1988, pp. 232-254.
Supplemental European Search Report for App. No. 989390978.6 dated Jun. 30, 2005.
Smith, Richard E., Constructing a High Assurance Mail Guard, Secure Computing Reprint Series, 1994.
Cate, Vincent, "Email-Firewalls"/Instant Corporate PGP, May 21, 1994.
Kohno, Masaru; Takano, Kazuo; Yoshida, Kazuki and Ogata, Tsutomu, Deterioration Forecast of Sealed Lead-Acid Batteries by Discharge of Short Time, Shingaku Sogo Taikai B-477, 1996.
Tong, Fangwei; and Yoshihiko, Akaiwa, Residual Timing Error Dependence on Weighting Parameters for Autonomous Timing Synchronization Methods; Kyushu Institute of Technology, Shingaku Sogo Taikai, B-477, 1995.
Department of the Army, U.S. Army Corps of Engineers; Emergency Employment of Army and Other Resources; Emergency Operations Center Standard Operating Procedures (HQUSACE-EOCSPO); Jul. 12, 1994.
Matunaga, Yasuhiko and Sebayashi, Katsuhiro, Adaptive Route Filtering for the Stable Internet Routing, NTT Multimedia Networks Laboratories, Tokyo, Technical Report of IEICE SSE 97-5 (Apr. 1997).
Nikkei Open Systems, No. 52, Jul. 1997, pp. 316-346.
Net PC, Feb. 1997, pp. 158-163.
Windows NT vs X, Interface, May 1994, pp. 203-212.

* cited by examiner

E-MAIL FIREWALL WITH STORED KEY ENCRYPTION/DECRYPTION

Matter enclosed in heavy brackets [ ] appears in the original patent but forms no part of this reissue specification; matter printed in italics indicates the additions made by reissue.

RELATED APPLICATION

This application *is a continuation of U.S. application Ser. No. 09/180,377 filed Nov. 3, 1998, now U.S. Pat. No. 6,609, 196, which was the National Stage of International Application PCT/US98/15552, filed Jul. 23, 1998, and which* claims [priority to] *the benefit of* U.S. Provisional [Patent] Application 60/053,668, filed on Jul. 24, 1997.

TECHNICAL FIELD

This application pertains generally to the field of computer security and more specifically to security for electronic mail systems.

BACKGROUND

The widespread use of electronic mail (e-mail) and groupware applications coupled with the growth and ubiquity of the Internet have opened new avenues for business level communications and electronic commerce. Organizations are increasingly relying on e-mail for the transfer of critical files such as purchase orders, sales forecasts, financial information and contracts both within the organization and increasingly with other organizations via the Internet. In this setting, these files are now tangible information assets that must be protected.

A number of conventional security measures exist to insure the confidentiality and integrity of modern data communications. For example, traditional firewalls prevent network access by unauthorized users. Secure sockets technology allows for data to be passed securely over the World Wide Web (WWW). E-mail, however, which is by far the most prominent application over the Internet, still remains problematic, from a security standpoint, for most organizations. Many traditional firewalls simply limit access to information protected by the firewall but do not contain the capability to limit transfer of information, into or out of an organization, by way of e-mail. This can lead to inadvertent or deliberate disclosure of confidential information from e-mail originating within an organization and introduction of viruses from e-mail entering an organization.

One solution to protecting confidentiality of e-mail messages is by encrypting such messages. Further security is available by way of digital signatures, which provide for authentication of e-mail messages. Encryption and authentication are both supported in the S/MIME (Secure/Multipurpose Internet Mail Extensions) messaging protocol defined in documents generated by the Internet Engineering Task Force (IETF) entitled "S/MIME Message Specification" (1997) and "S/MIME Certificate Handling" (1997). Individual users can encrypt/decrypt and authenticate e-mail messages using commercially available software. However, the use of software to perform such tasks is not always simple and therefore can detract from the inherent ease of use of e-mail as a means of communication. Moreover, an organization wishing to use such software must rely on individual users to encrypt all necessary messages without means of any centralized control. In addition, many conventional firewalls contain no capability to control the content or format of certain messages that enter or exit an organization. For example, many conventional firewalls contain no capability to ensure that e-mail meeting certain criteria such as content or source and/or destination address or domains, is encrypted. In addition, many conventional firewalls contain no capability to control unwanted messages entering an organization such as unsolicited e-mail advertising.

There is accordingly a need for an e-mail firewall that provides improved centralized control over e-mail messages exiting and entering an organization.

SUMMARY OF THE INVENTION

In a principal aspect, the present invention provides an e-mail firewall (105) for screening e-mail messages (204) originating in, or entering into a computer network (101, 103). Embodiments employing the principles of the present invention advantageously take the form of an e-mail control system (105) that controls e-mail messages (204) transmitted from and received by a computing site. The e-mail control system (105) includes a message encryptor (526) which encrypts, in accordance with at least a first stored encryption key (528), a first designated type of message (204) transmitted from the computing site. A message decryptor (552) decrypts, in accordance with at least a second stored encryption key (528), a second designated type of message (204) received by the computing site. A filter (216) monitors messages (204), after decryption by the decryptor (552) and before encryption by the encryptor (526), in accordance with changeable filter information (216).

A significant advantage of such embodiments is increased centralized control of e-mail policies by an organization. All e-mail messages entering into or originating within an organization can be encrypted or decrypted and filtered in accordance with policies imposed by the organization. Individual users of desktop computers within the organization therefore need not be concerned with ensuring that they comply with e-mail policies of the organization. E-mail messages can be monitored for certain content, or for certain sources or destinations.

Advantageously, embodiments employing the principles of the present invention operate transparently to individual users within an organization. For example such individual users need not be concerned with complying with encryption policies of the organization. E-mail messages containing certain content, or originating from, or being transmitted to specified addresses or domains, can be automatically encrypted and/or filtered. For example, if an organization (e.g. Company A) which frequently exchanges e-mail with another organization (e.g. Company B) determines that all e-mail to Company B should be encrypted for security purposes, then an e-mail firewall in Company A, as described above, can be configured to recognize the domain name of Company B and to store an encryption key. Thereafter, all e-mail messages from Company A to Company B will be encrypted by the above described e-mail firewall without requiring any additional action by individual users. If Company B has installed an e-mail firewall employing the above described principles then that email firewall can be configured to decrypt messages from Company A. Individual recipients in Company B of e-mail from Company A therefore need not take any additional action to decrypt e-mail from Company A. All e-mail messages from Company A to Company B can therefore be securely exchanged with no intervention from users at Company A or Company B. Of course, the e-mail firewall of Company B can be configured to allow similar transmission of e-mail messages from Company B to Company A.

In addition, other policies can be enforced with respect to transmission of messages between Company A and B. For example, inadvertent (or even deliberate) disclosure of certain information between Companies A and B can be reduced by configuring the above described filter of the e-mail firewall in question with rules to recognize and prevent transmission of e-mail messages containing certain terms or phrases. The e-mail firewall may also be configured with exceptions to such rules. For example, e-mail from or to certain users may be exempted from such rules. Also, actions taken by the e-mail firewall after a message is prevented from being transmitted are changeable. For example, the message in question may be returned to the sender with an explanatory message. Alternatively, or in addition, the message may be stored for viewing by an administrator, or the messages may be deleted. Multiple encryption keys, each associated with one or more domains or individual addresses, may be stored in e-mail firewalls employing the aforesaid principles to allow secure communications with multiple domains and/or individual users.

DETAILED DESCRIPTION OF THE PREFERRED EMBODIMENTS

Figure 1:
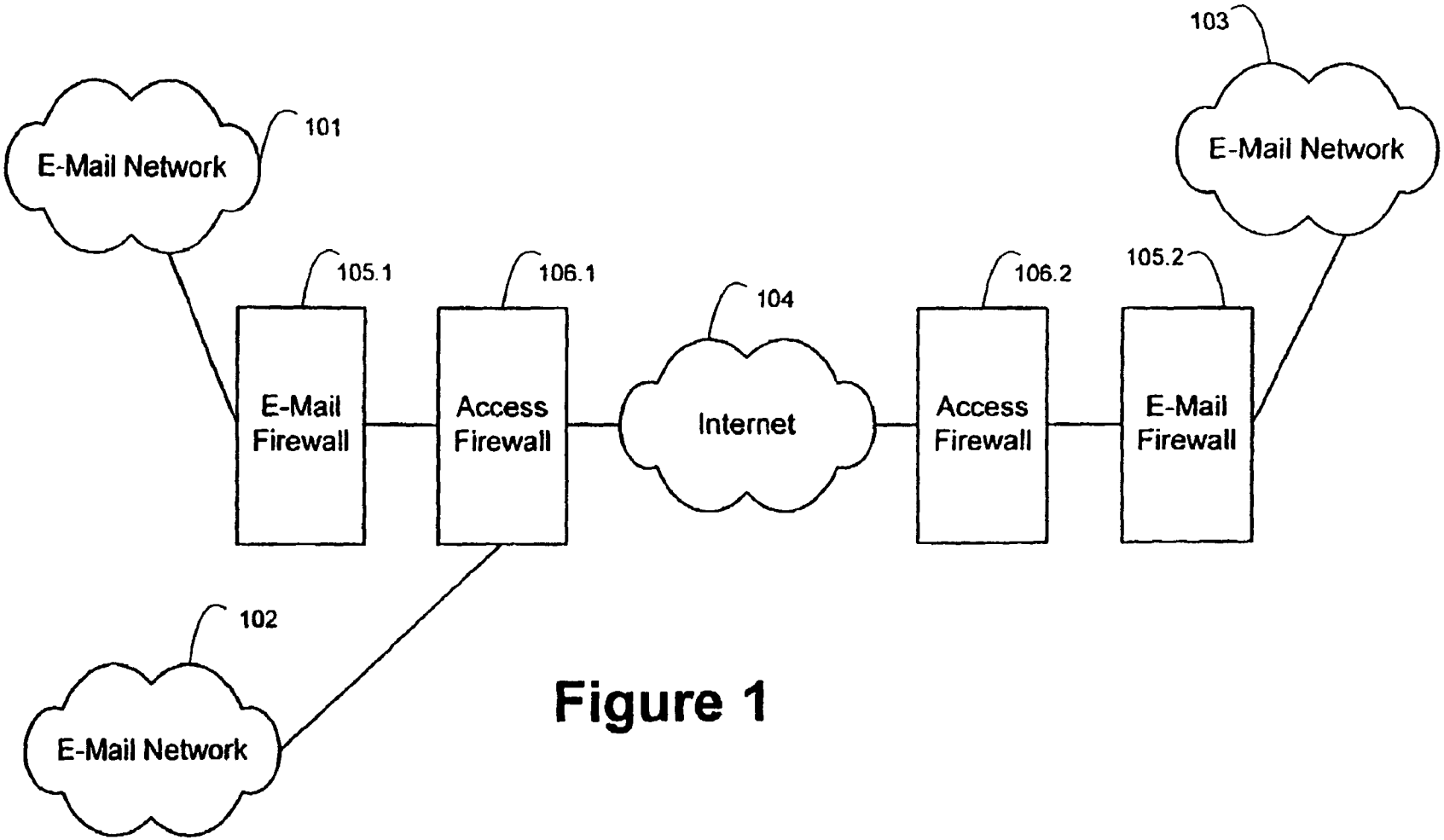
FIG. 1 of the drawings is a block diagram showing a plurality of e-mail networks which are coupled by way of the Internet and which employ an e-mail firewall employing the principles of the present invention.

In FIG. 1 of the drawings, e-mail networks 101 and 102 are coupled to e-mail network 103 by way of a Wide Area Network (WAN) 104 such as the Internet. Disposed between the internet 104 and e-mail network 101 and 103 are an access firewall 106 and an e-mail firewall 105. E-mail network 102 is coupled to Internet 104 only by access firewall 106.1. E-mail networks 101, 102, and 103 may each take a conventional form. For example, e-mail networks 101-103 may take the form of a Local Area Network (LAN) or a plurality of LANs which support one or more conventional e-mail messaging protocols. Access firewalls 106 may also take a conventional form. Access firewalls 106 operate to limit access to files stored within a computer network, such as e-mail networks 101-103, from remotely located machines. E-mail firewalls 105 (individually shown as 105.1 and 105.2) advantageously take a form as described in further detail herein to control transmission of electronic mail messages between an internal site and one or more external sites. An internal site for e-mail firewall 105.2, by way of example, may take the form of e-mail network 103. External sites for e-mail firewall 105.2 are any sites not contained in e-mail network 103. For example, external sites for e-mail firewall 105.2 are any sites in e-mail networks 101 and 102 as well as any other sites coupled to Internet 104. E-mail firewall 105 is preferably positioned on the "safe-side" of the access firewall 106. FIG. 1 should be understood as showing, by way of an example, the principles of the embodiments described herein. The access firewalls 106 are shown only for purposes of explanation and are not required for operation of embodiments employing the principles of the present invention.

Preferably the e-mail firewall 105 takes the form of a program executing on a conventional general purpose computer. In an exemplary embodiment, the computer executes the Windows NT or Windows 2000 operating systems available from Microsoft Corp., of Redmond, Wash. In other embodiments, the computer executes a Unix operating system such as Solaris from Sun Microsystems, of Mountain View, Calif. Although e-mail firewall 105 is shown in FIG. 1 as operating on e-mail messages between an internal site and an external site, the e-mail firewall 105 may also be used to exchange messages between two internal sites for computer networks with SMTP compliant messaging backbones.

Figure 2:
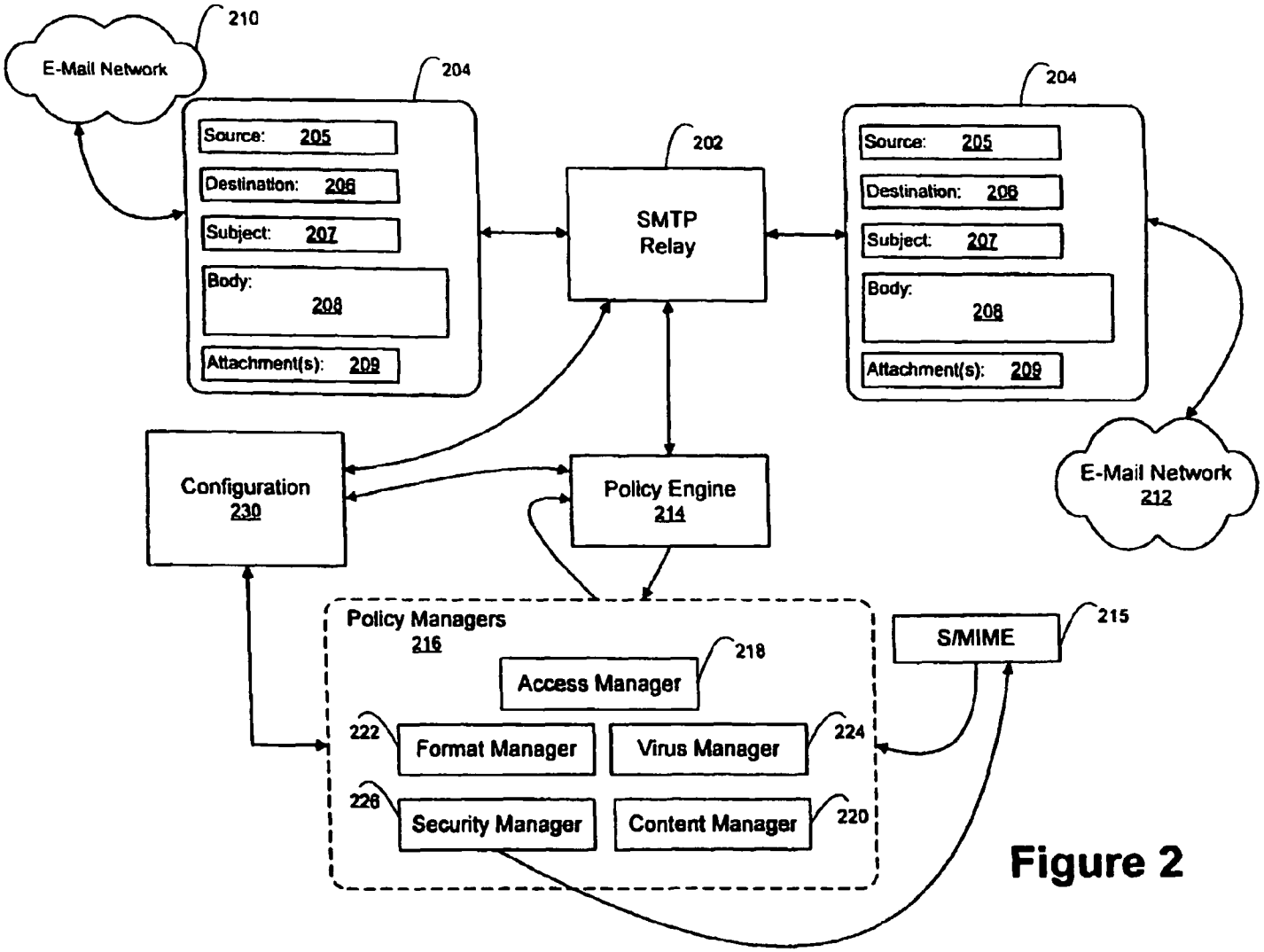
FIG. 2 of the drawings is a block diagram of a preferred embodiment of an e-mail firewall.

FIG. 2 of the drawings illustrates in block diagram form the major functional components of e-mail firewalls 105.1 and 105.2. In FIG. 2, a Simple Mail Transfer Protocol (SMTP) relay module 202 performs the functions of a conventional SMTP relay host. An example of an Internet relay host is a UNIX Send mail program. The SMTP relay module 202 transmits and receives e-mail messages such as shown at 204 to and from an internal site 210 and external sites 212. E-mail message 204 takes the form of a conventional e-mail message which contains a plurality of user specified information fields, such as source field 205 specifying an e-mail address for the source of the message 204, a destination field 206 specifying one or more destination e-mail addresses for the message 204, a subject field 207 specifying a subject for the message 204, a body field 208 specifying the body of the message 204 containing textual and/or graphics data, and an optional attachment field 209, specifying one or more files to be transmitted with the message 204. Other user specified fields include, but are not limited to, priority of the message, identity of the sending agent, and the date and time of the message.

E-mail message 204 may be encoded in accordance with one of a plurality of encoding formats as explained in further detail below. SMTP relay module 202 preferably takes a conventional form of a software module which receives and transmits e-mail messages in accordance with the Simple Mail Transfer Protocol as specified by 'Internet RFC 821.' The SMTP protocol is not critical to the invention. In other embodiments, the SMTP relay module is replaced with a module that receives and/or transmits messages in other formats such as the File Transfer Protocol (FTP), the Hyper-Text Transfer Protocol (HTTP), the Network News Transfer Protocol (NNTP), or the Internet Relay Chart (IRC).

In one embodiment, the SMTP relay module 202 is configured to use the Domain Name System (DNS) to determine routing to message recipients or alternatively is configured to relay messages to at least one administrator specified SMTP host. If DNS is selected, at least one SMTP host is specified to allow for default message forwarding even if DNS service is not available. The routing option can be overridden on a per-domain basis. The SMTP relay module 202 advantageously allows inbound and outbound SMTP connections to be limited from or to specific hosts and allows connections to or from specific SMTP hosts to be denied. Preferably, the SMTP relay module 202 transmits messages that include text messages and binary data e-mail messages, as is known in the art. The following illustration refers to a generic routing server, which facilitates some of the functionality provided by the SMTP relay module 202 to transmit e-mail messages in accordance with the invention.

Figure 3:
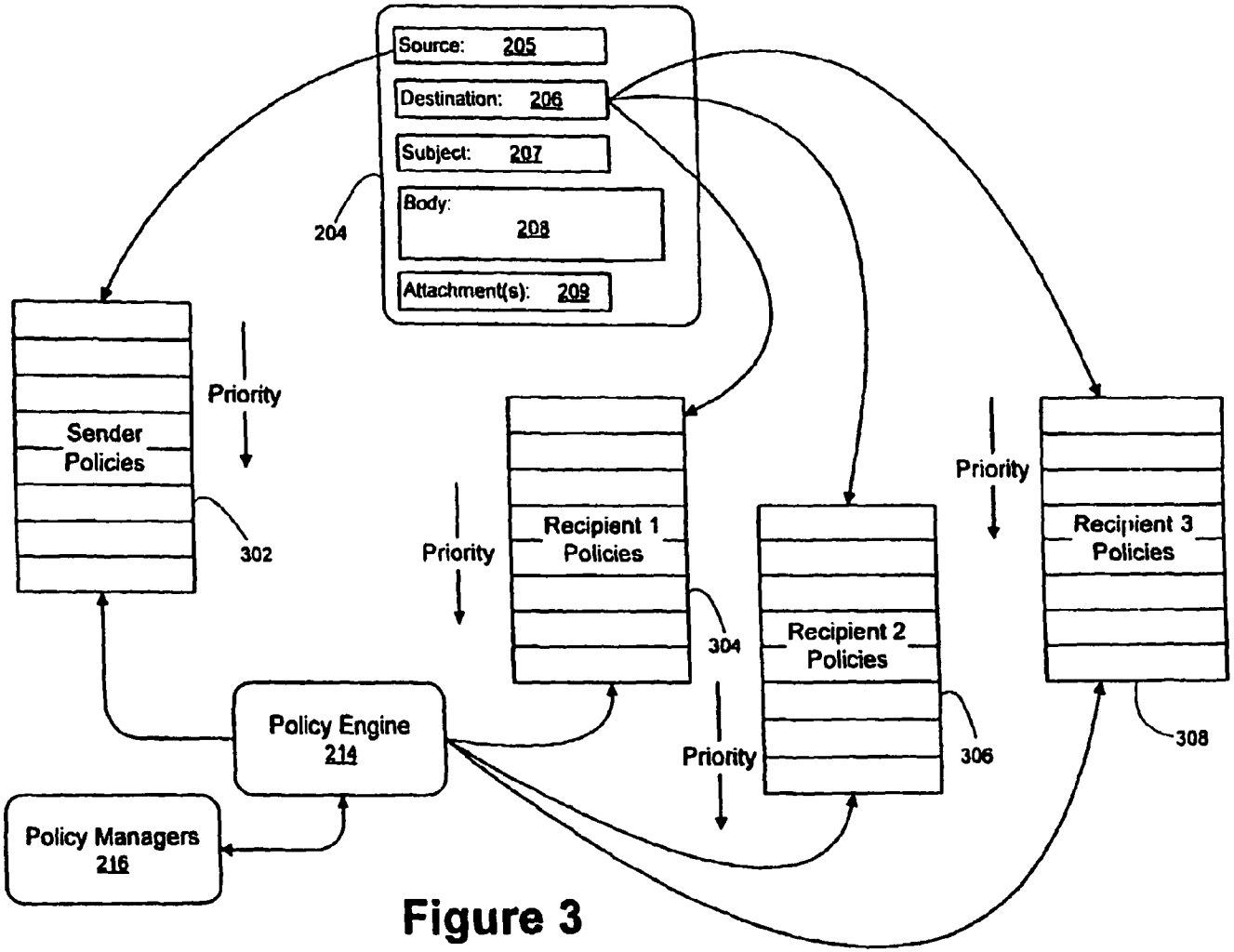
FIGS. 3 and 4 are block diagrams illustrating further details of operation of the e-mail firewall of FIG. 2.

FIG. 3 illustrates the manner in which messages received by the SMTP relay module 202 from internal site 210 and external site 212 are processed by policy engine 214. Policy engine 214 accepts messages from SMTP relay module 202 and determines which policies are applicable to a message by building a list 302 of sender policies for the sender (source) 204 of the message, and building a list 302, 306, and 308 of recipient policies for each recipient. The policy engine 214 then calls the policy managers 216 to apply each policy. The different types of policies have a predetermined priority in which they are applied. For example, decryption policies are applied before other policies, to allow the policies that operate on the body 208 of the message to be able to access the contents contained therein. In an alternative embodiment, the order in which the policies are applied is selectable by a system administrator. Access manager policies get applied after decryption policies and then the other policy managers are called repeatedly in the order implied by the policies to be applied to the message. The policy engine 214 then receives results from policy managers 216 and transmits messages to SMTP relay module 202 in accordance with the received results. The results received by the policy engine 214 comprise actions such as disposition, annotation, and notification described in further detail herein. The result of processing of a message 204 by policy engine 214 can result in generation of a plurality of additional messages, for example, for notification to the sender or recipient, or to the system administrator. In a preferred embodiment, the policy engine 214 is implemented as a program executed by a digital computer.

Policy managers 216 operate to enforce policies entered by an administrator of e-mail firewall 105. Policy managers 216 preferably comprise a plurality of modules for enforcing administrator configured policies, directed to specific aspects of e-mail messages. For example, in e-mail firewall 105, policy manager 216 implements a plurality of manager modules including an access manager 218, a content manager 220, a format manager 222, a virus manager 224, and a security manager 226. Policy managers 216 are preferably developed by inputs entered by an administrator by way of configuration module 230. Configuration module 230 also operates, in response to information entered by an administrator, to configure SMTP relay 202 and policy engine 214. The policy managers shown in FIG. 2 and described herein are merely illustrative of an exemplary embodiment. Other types of policy managers are contemplated as being within the principals described herein. As may further be appreciated, the policy managers 216 operate to enforce policies on all portions of the message in a recursive manner. Thus, when a massage contains another message as an attachment, or when an attachment includes several files, e.g., ZIP. File, the various modules operate on such included content regardless of how far within deep message the content is extracted from. Thus, when an e-mail has another e-mail attached which has an archive attached to it, the policy managers 216 operate on the received e-mail, the attached e-mail, extract all files from the archive, and operate on each of the extracted files.

Access manager 218 provides enforcement of access control policies such as destinations to which e-mail is prohibited from being sent, or sources from which e-mail cannot be received. In one embodiment, the access manager 218 refers to a directory, such as a LDAP directory, when reviewing message destinations and sources. Access manager 218 can also filter messages that exceed a maximum message size determined by an administrator, or which contain specific words in the subject field 207 of the message. Access manager 218 can also filter a message by the priority of the message specified by the user. For example, high priority messages can be passed through immediately, while low priority messages are stored in a queue (explained in further detail in connection with FIG. 7). Access manager 218 can also filter messages by the date and/or time of transmission of the message. For example, messages transmitted between certain hours of the day or on certain days, such as weekends or holidays may be retained or further filtered by, for example, content manager 220.

Content manager 220 supports the enforcement of content control policies. The content manager 220 examines the message's content to determine if a content policy is applicable to the message. Preferably content manager 214 supports filtering by one or more of the following criteria: (a) specific words, or word patterns, in the body 208; (b) specific words in the subject 207; (c) attachment 209 (all or by name/type such as video or sound); (d) specific words, or word patterns, in the attachment 209. In one embodiment, the number of filter criteria matches is tracked to provide a match total for the message. The match total is then compared to a threshold to determine whether a dependent criteria is satisfied. For non-plain text attachments, such as PDF files and spreadsheets, text is extracted by employing well known content extraction software such as filter programs widely available as open source software. Filtering by attachment type also includes prompting a signature verification process for certain type attachments, such as executables. Content control policies, and other appropriate policies, can also be specified to require certain material, such as for example, certain notices or disclaimers. Other content policies block messages that include executables, including interpreted executables such as JavaScript. This blocking can extend to attachments that include embedded code or macros. In some embodiments, the prohibited embedded code is removed from the attachment while the message is allowed to pass to the recipient. This blocking is one form of preventing virus programs from infecting a recipient computer. A second form is enforcement provided by virus manager 224.

Virus manager 224 supports the enforcement of virus control policies by detecting virus infected e-mail attachments. Virus manager 224 preferably detects viruses contained in a plurality of compressed file formats including PKZip, PKLite, ARJ, LZExe, LHA, and MSCompress. Virus manager 224, by way of example, may use a commercially available virus scanning engine. Virus manager 224 also preferably applies policies on "clean messages," that is, messages that have been scanned for a virus and found to be free of any viruses. In this embodiment, a "clean stamp" annotation is added to such messages, indicating that no viruses were detected.

Format manager 222 provides conversion of an e-mail message from a first format to a second format. In a preferred embodiment, format manager 222 converts messages from conventional UUENCODE format to MIME format. Preferably format manager 222 converts messages prior to message processing by other policy managers.

Security manager 226 preferably enforces a plurality of e-mail encryption policies. Preferably, security manager 226 enforces a client security usage policy, a preserve encryption policy, a plain text access policy, and default action policies. Security manager 226 also applies on behalf of users proxy encryption and signature policies, as discussed in further detail in connection with FIG. 5(b).

Other actions associated with the policy managers 216 include prompting for secure delivery and archiving the message. In one embodiment, secure routing is implemented by forwarding the message to the destination over a predefined transmission route such as that provided by Transport Level Security (TLS) routing. In another embodiment, secure routing is by a redirection of the message to a secure message delivery service such as IME service from Tumbleweed Communication of Redwood City, Calif.

In one embodiment, client security usage policies specify that certain users, under certain conditions, should perform encryption or signature, or both, at the desktop. Additional criteria can be set to indicate when this policy should be enforced. For example, an e-mail from a company's CEO to the company's legal counsel by the domain or full e-mail address can be specified to require either encryption, signature, or both, to enforce attorney-client privilege and to preserve encryption policies. Moreover, client security usage policies can be used to specify that messages, which are already in encrypted form and perhaps meet some other criteria, should be preserved. Thus, such messages are not processed, modified, or encrypted by the e-mail firewall 105. Furthermore, the security policy may also select varying encryption methods as a result of applying policy to transmitted e-mail. Plain text access policies require that the e-mail firewall 105 is designated as a recipient on certain types of specified messages. The e-mail firewall 105 is designated as a recipient on encrypted messages in order to apply access, content, virus, and other policies on the message. Plain text access policies can also be used to send a signed notification to the sender of a message as a way of providing the sender with the e-mail firewall's 105 public key. Default action policies indicate the action to be taken on messages, which are not encrypted and will not be encrypted by the e-mail firewall 105, and which might meet some other criteria. The default action policy type is used to ensure that certain messages get encrypted somewhere, whether at the desktop or by the e-mail firewall 105.

Figure 4:
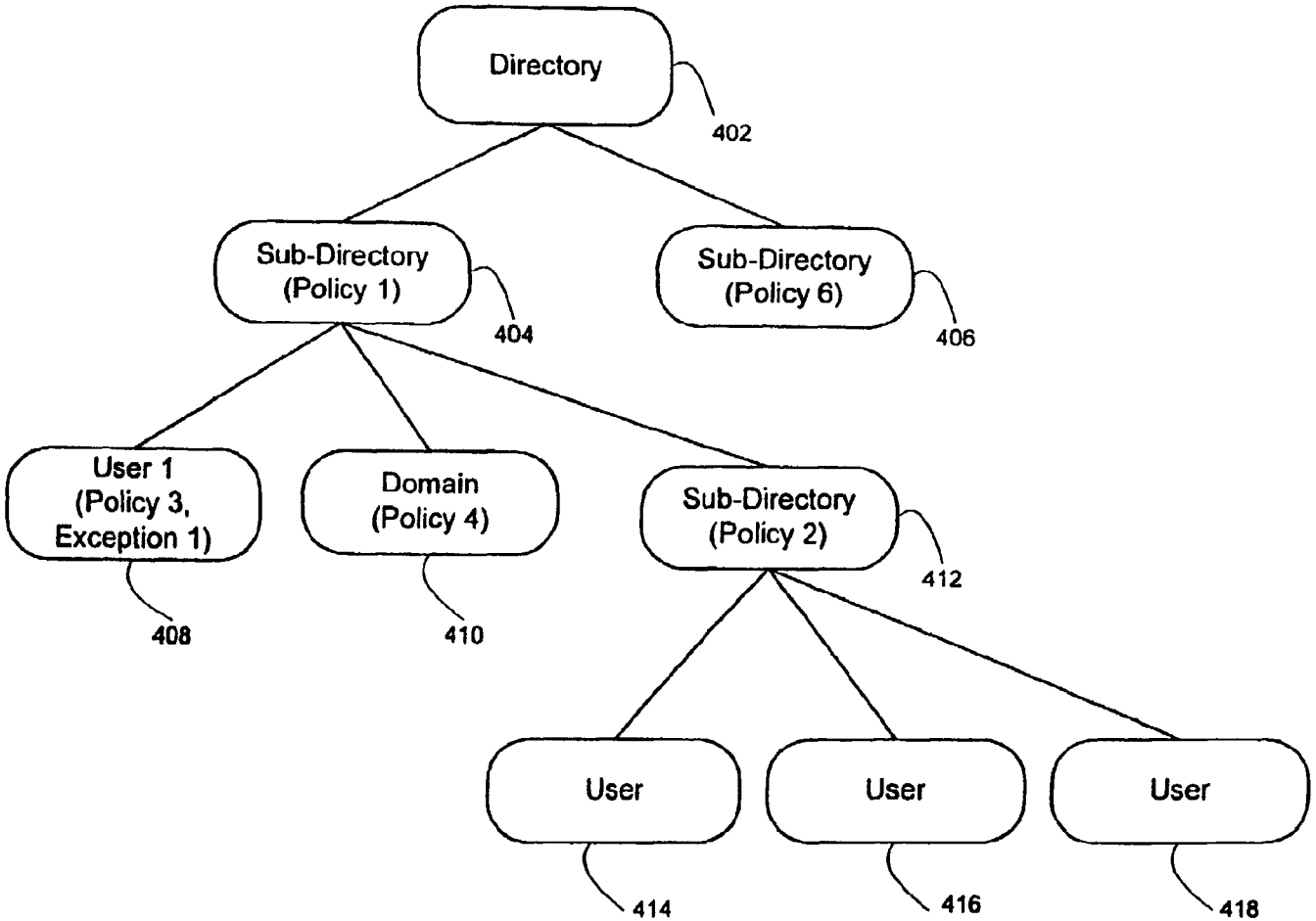

Policies are preferably entered by an authorized administrator by way of configuration module 230 which preferably takes the form of a program executing on a stored program computer. Policies can advantageously be applied to users, either individually or by e-mail domains or other groupings. FIG. 4 shows an example of how policies are applied. Users can be organized in a hierarchical directory-type structure to facilitate grouping of users and/or domains. If a policy is applied to a given directory then sub-directories corresponding to the given directory inherit such policies. For example, in FIG. 4, policy 1 applies to sub-directory 404 and thus applies to all sub-directories, domains and users, such as sub-directory 412, user 408, and domain 410, corresponding to sub-directory 404, unless that policy is explicitly overridden by another policy applied to a particular sub-directory or to an intervening sub-directory. For example, policy 3 will override policy 1, for users shown at 408, where there are conflicts between policy 1 and policy 3, and will supplement policy 1, where there are no conflicts. Exception 1 will override policies 1 and 3 for the particular exception specified in exception 1. As further shown in FIG. 4, policy 1 applies to users 414, 416, and 418, and is overridden by policy 2 for users 414, 416, and 418 in the event of conflicts, and is supplemented where there are no conflicts. This advantageously allows policies to be easily applied to groups of users. The exact manner in which the policies are stored is not critical, and a variety of means and formats of storage may be employed.

E-mail messages 204 received and/or transmitted by SMTP relay 202 are preferably encoded in accordance with the S/MIME (Secure/Multipurpose Internet Mail Extension) protocol, as specified by the Internet Engineering Task Force in documents entitled "S/MIME Message Specification" (1997) and "S/MIME Certificate Handling" (1997). Advantageously, the S/MIME protocol builds security on top of the industry standard MIME protocol according to Public Key Cryptography Standards (PKCS) specified by RSA Data Security, Inc. S/MIME advantageously offers security services for authentication using digital certificates, and privacy, using encryption. Digital certificates are preferably implemented in accordance with the X.509 format as specified in "Information Technology—Open Systems Interconnection—The Directory: Authentication Framework," also known as "ITU-T Recommendation X.509" (June 1997). Encryption is preferably performed by one of the following symmetric encryption algorithms: DES, Triple-DES, RC2, and other algorithms introduced by revisions of the S/MIME standard. The S/MIME protocol is well known and widely used and provides encryption and digital signatures and is therefore preferable as a communications protocol. The precise details by which the protocol operates is not critical. Moreover, it should be understood that other secure messaging protocols such as PGP (Pretty Good Privacy) or Open PGP, as specified by the ITF working group, may also be used.

Access manager 218 is the first policy manager to process e-mail message 204. Access manager 218 operates only on message header information which is not encrypted. Thus, access manager 218 may operate on an e-mail message 204 prior to decryption by S/MIME engine 215. The term "message header information" generally refers to portions of message excluding the body 208 (and commonly referred to as message text), and attachments 209. Thus, the header information includes the source, destination, and subject fields (205, 206, 207). Optional header fields include date/time stamp, priority, and sending agent. The remainder of the modules operate on the message 204 after processing by S/MIME engine 215. As previously noted, format manager 222 preferably operates on messages prior to operation by other managers such as virus manager 224, security manager 226, and content manager 220.

Figure 5A:
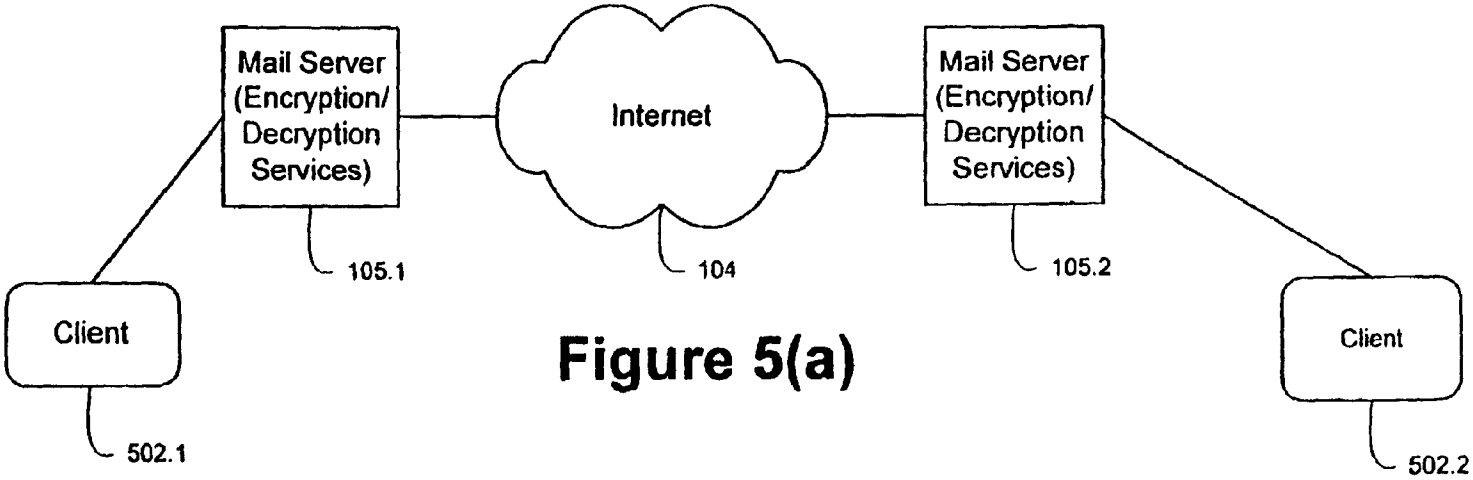
FIGS. 5(a), 5(b) and 5(c) are block diagrams illustrating alternative secure e-mail communication mechanisms.

The S/MIME protocol allows two sites which support the S/MIME protocol to exchange secure e-mail messages 204. A type of virtual private network (VPN), as shown in FIG. 5(a), can be achieved if both the transmitting and receiving site perform S/MIME functions. The resulting VPN, termed herein an "object level e-mail VPN," provides encryption/signature and/or decryption/verification of messages between transmitting and receiving site(s). In the object level e-mail VPN shown in FIG. 5(a), each object (message) is encrypted individually and sent over a standard (SMTP) transport medium, where each object (message) is decrypted at the other end. Advantageously, the object level e-mail VPN does not require a secure real-time connection as required by conventional VPNs. As shown in FIG. 5(a), mail servers 105.1 and 105.2 perform functions described herein for e-mail firewall 105, and as a result, achieve an object level e-mail VPN between them. E-mail that is encrypted and transmitted between servers 105.1 and 105.2 is protected from disclosure to third parties, despite the fact that e-mail transmitted via the Internet 104 may pass through numerous unsecured servers before reaching its destination. Accordingly, one may appreciate that it is not required for the intermediate e-mail relay servers between servers 105.1 and 105.2 to support encryption or decryption of messages.

In one embodiment, in such an exchange, e-mail firewalls 105.1 and 105.2 provide key pair and public key certificate generation and provide automated or manual public key certificate exchange with the other S/MIME server. In addition, e-mail firewalls 105.1 and 105.2 allow: identification of the other S/MIME server through directory domain records, association of directory domain records with server certificates and selection of encryption/signature algorithms and key lengths. The directory domain records, and the directory user records referred to below, are as described in FIG. 4.

Figure 5B:
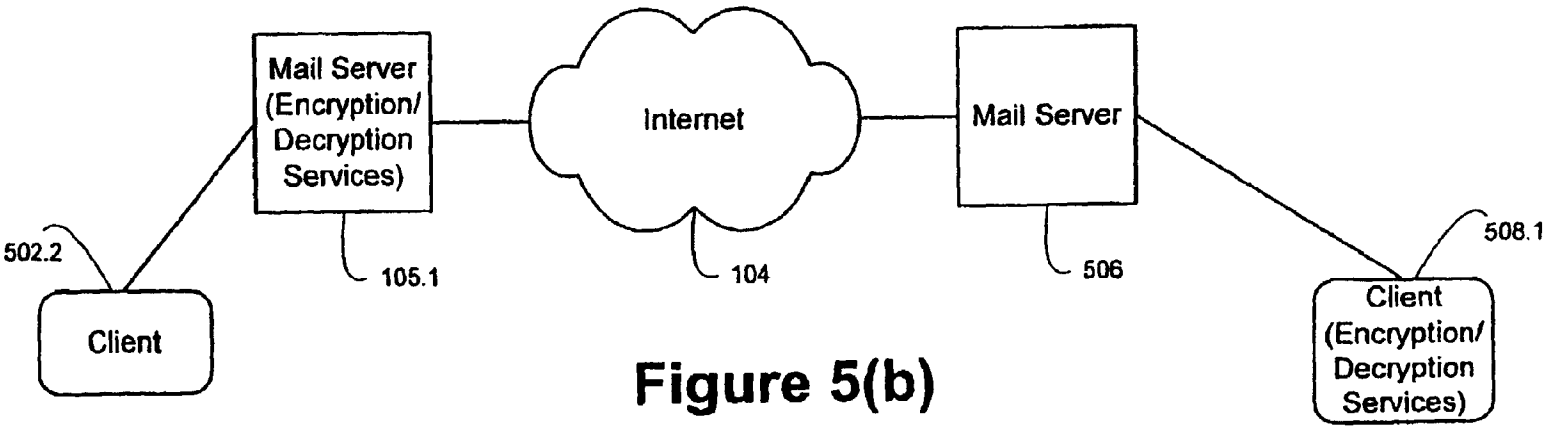

Exchange of S/MIME encoded messages may also be performed between the e-mail firewalls 105.1, 105.2 and an S/MIME client coupled in a server that does not perform S/MIME functions. FIG. 5(b) illustrates an exchange between e-mail firewall 105 and a S/MIME client coupled to a non-S/MIME server 506. In FIG. 5(b), server 105.1 encrypts and decrypts messages on behalf of client 502.2 and generally provides the functions described above for e-mail firewalls 105.1 and 105.2. Specifically, in such an exchange, e-mail firewall 105.1 provides key pair and public key certificate generation and provides automated or manual public key certificate exchange with the client 508.1. In addition, e-mail firewall 105.1 allows: identification of the client 508.1 through directory user records, association of directory user records with user certificates and selection of encryption/signature algorithms and key lengths. Client 508.1 provides encryption/decryption services to allow messages to be transmitted securely through server 506 by supporting encryption/decryption services. A specific type of object level VPN, referred to herein as "proxy security," is achieved in FIG. 5(b) between the server 105.1 and the client 508.1. In proxy security, at least one client is involved in performing encryption/decryption, such as client 508.1 in FIG. 5(b). This is in contrast to the arrangement of FIG. 5(a), where the encryption/decryption services performed by servers 105.1 and 105.2 is transparent to the clients 502.1 and 502.2.

Figure 5C:
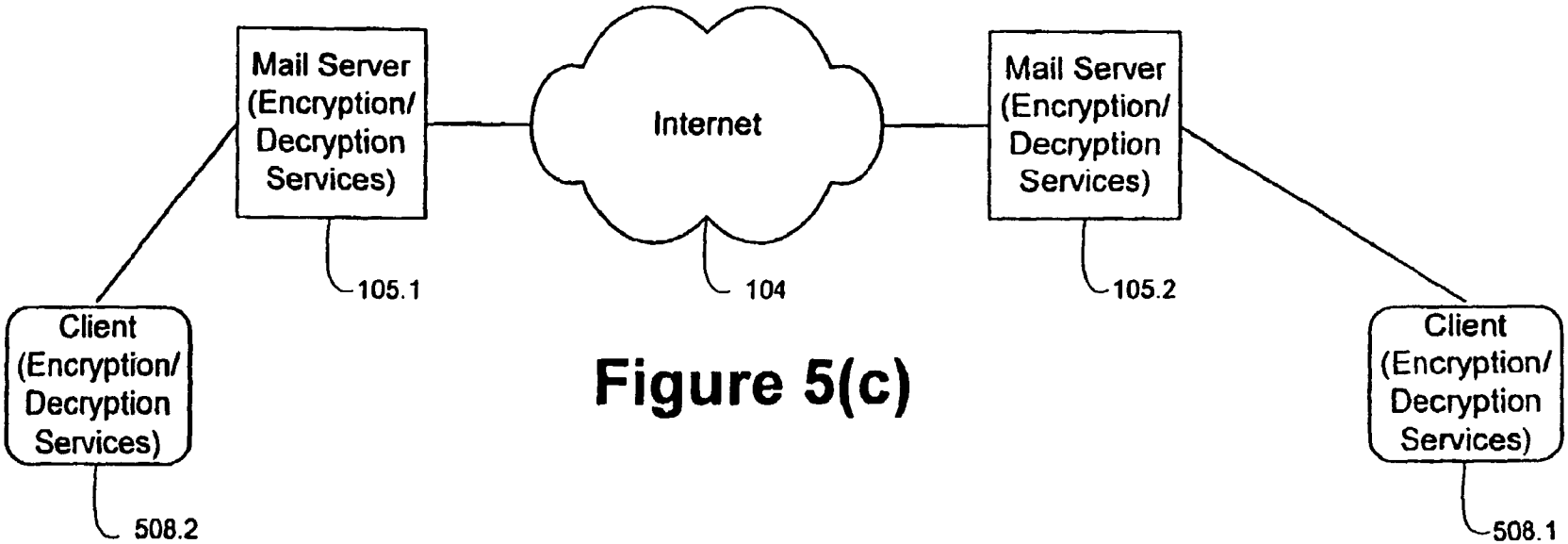

In FIG. 5(a), communications between servers 105.1 and 105.2 are secure, but communications between clients 502.1 and 502.2 and their respective servers 105.1 and 105.2 are not necessarily secure. In many such installations, security is not necessary because the client 502.1 and the server 105.1 typically communicate over a common LAN, which is protected from the Internet by a standard firewall. However, if such security is desired, the clients 508.1 and 508.2 can also be equipped with encryption/decryption services to perform proxy security, as is shown in FIG. 5(c). The servers 105.1 and 105.2 perform the same function described above in connection with FIG. 5(a) and therefore achieve an object level VPN. In addition, the clients 508.2 and 508.1 allow secure communications with the corresponding servers 105.1 and 105.2. It should be noted that the encryption/decryption performed by servers 105.1 and 105.2 can be independent of the encryption performed by the corresponding clients 508.2 and 508.1. For example, a message by client 508.2 to client 508.1 may be encrypted when transmitted to server 105.1, decrypted by server 105.1 and subjected to appropriate actions by the policy managers. The message may then be encrypted for transmission to server 105.2, decrypted by server 105.2, and subjected to appropriate actions by the policy managers, and encrypted for transmission to client 508.1 which decrypts the message. Alternatively, a message by client 508.2 to client 508.1 may be encrypted by client 508.2, be subjected to appropriate actions to non-encrypted portions, such as the destination field, and then the entire message, including the portions not encrypted by client 508.2, can be encrypted again by server 105.1 for transmission to server 105.2, which decrypts the encryption by server 105.1, and transmits the message to client 508.1 for decryption of the encryption performed by client 508.2. Several combinations of the foregoing two scenarios are possible. In another embodiment, the client to server connection is protected by means other than object level security such by using a Secure Socket Layer (SSL) connection while the connection between servers is by an object level VPN in accordance with the invention.

Figure 6A:
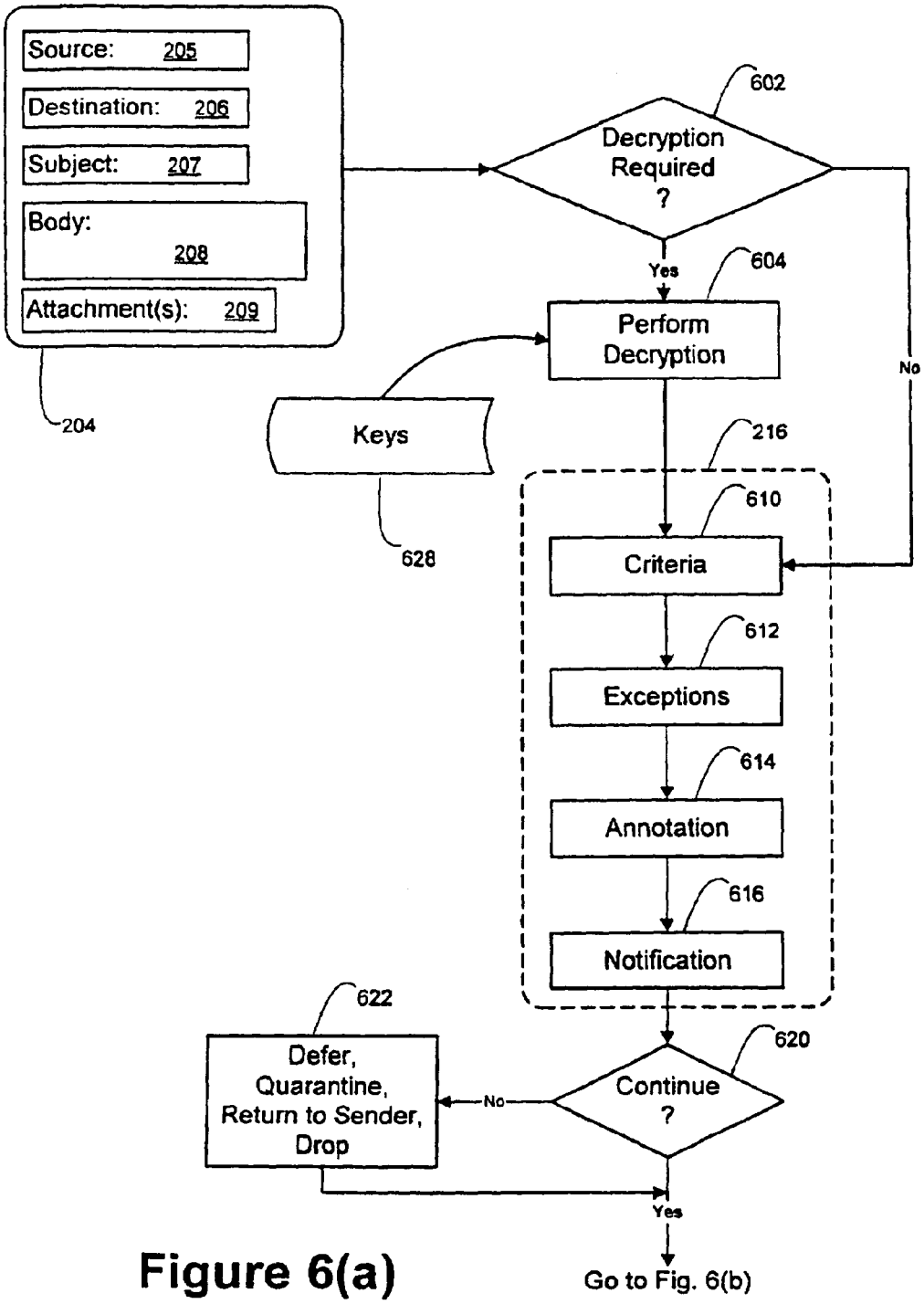
FIGS. 6(a) and 6(b) are flowcharts illustrating operation of a preferred embodiment of an e-mail firewall.
Figure 6B:
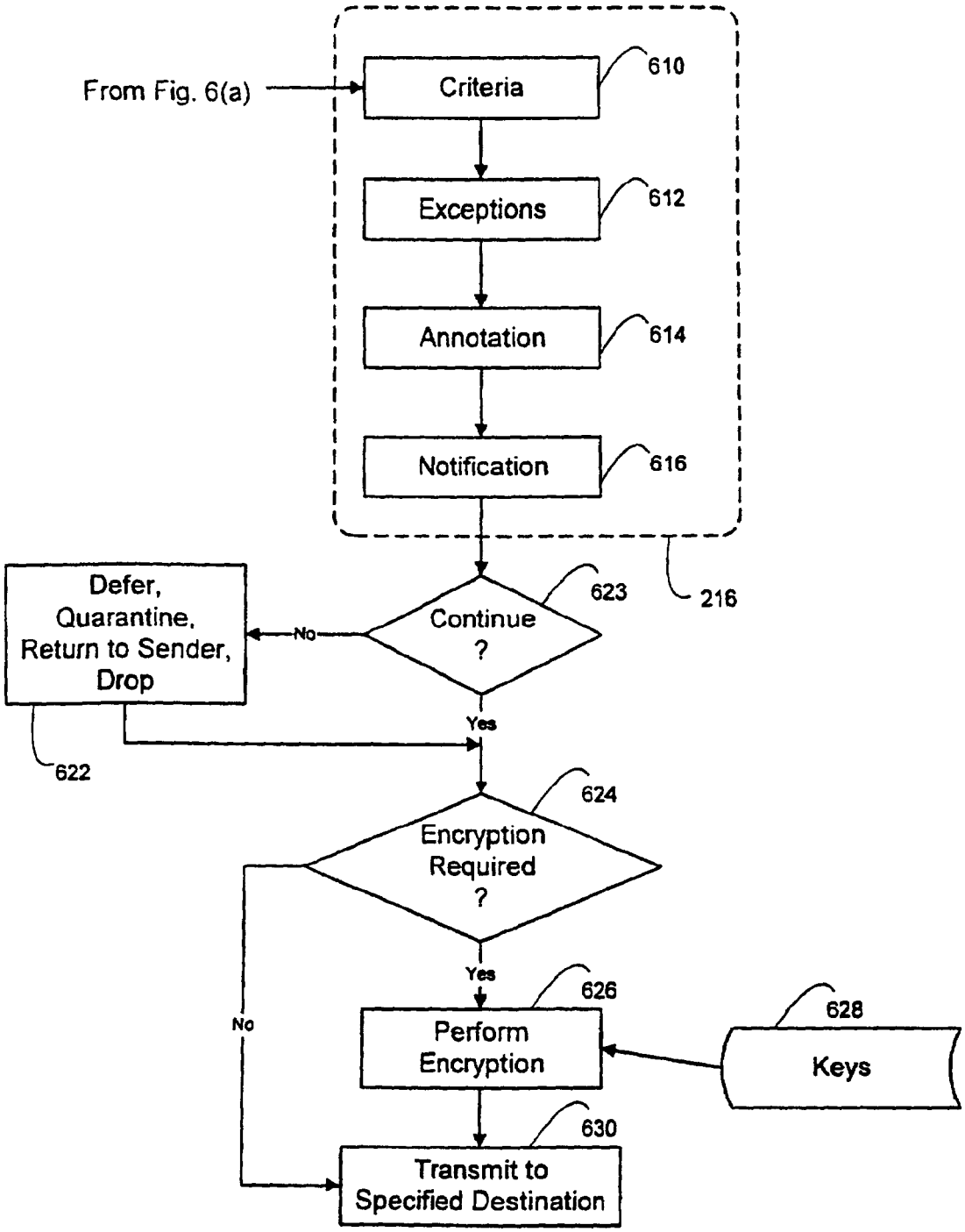

Each e-mail message 204 processed by e-mail firewall 105 is processed in accordance with the steps shown in FIGS. 6(a) and 6(b). FIG. 6(a) is a flowchart showing operation of the e-mail firewall 105 in response to a received message. FIG. 6(b) is a flowchart showing operation of the e-mail firewall 105 prior to transmitting a message. The messages processed by e-mail firewall 105 may be received from an internal site for transmission to an internal site, or may be received from an internal site for transmission to an external site, or may be received from an external site for transmission to an internal site. Any single message may include internal and external destinations 206. The steps shown in FIGS. 6(a) and 6(b) are preferably performed by generation of sender and recipient policies shown in FIG. 3. For multiple destinations, the steps shown in FIG. 6(b) may therefore be performed differently and have different results for different destinations.

Turning to FIG. 6(a), at 602, the e-mail firewall 105 determines if decryption of portions of the message 204 is required. If so, then at 604, decryption is performed in accordance with stored private keys 628. Storing private keys is well known in the art of public key cryptography. After decryption, or if no decryption is required, the e-mail firewall 105 applies policy managers 216, which can perform four types of actions (shown at 610, 612, 614, 616, and 620) on e-mail message 204 for each policy. Criteria actions 610 present filtering criteria selected by the administrator. Exception actions 612 determine which criteria 610 are excluded. Multiple criteria 610 can be selected which effectively results in a logical AND operation of the criteria. Multiple exceptions 612 can be selected which effectively results in a logical OR operation of the exceptions; that is, any one of the exception conditions being true will result in a policy not being triggered. In another embodiment, a generic Boolean expression is used in lieu of the criteria and exception combination. Annotation actions 614 cause generation of attachment to message 602 or insertion of text into the body 208 of the message. The manner by which annotations are made is based on a policy entered by the administrator. Notification actions 616 cause the sending of one or more e-mail notifications when a given policy is triggered. Notifications can be sent to sender, recipient, administrator, or any e-mail address that is defined by the administrator. In addition, notification actions 616 allow specification of whether the original message 204 should accompany the notification. Disposition action 620 determines whether the message should continue to the destination(s) (specified by field 620) or whether one of a plurality of alternative actions 622 such as deferral, quarantine, return to sender, or dropping of the message are required.

Referring now back to FIG. 6(b), the illustrated steps are performed for each destination specified for a message 204. The steps shown in FIG. 6(b) are also performed for messages generated by step 622. First, policy managers 216 perform actions 610, 612, 614 and 616, for each destination specified in the message 204. Disposition action 623, operates similarly to disposition action 620 by determining whether the message should continue to the destination(s) or whether one of a plurality of alternative actions 622 such as deferral, quarantine, return to sender, or dropping of the message, are required. At step 624, a determination is made if encryption or signature is required. If encryption is required, then at step 626 encryption is performed in accordance with stored keys 628. If a signature is required, a signature is added at step 629. Notice that some implementation may instead choose to sign before encrypting. The message is then transmitted to the specified destination at step 630. Messages that are processed by block 622 are also checked at step 624 before transmission. For example, messages that are deferred, quarantined, or returned to the sender, may need to be encrypted or include a signature.

Figure 7:
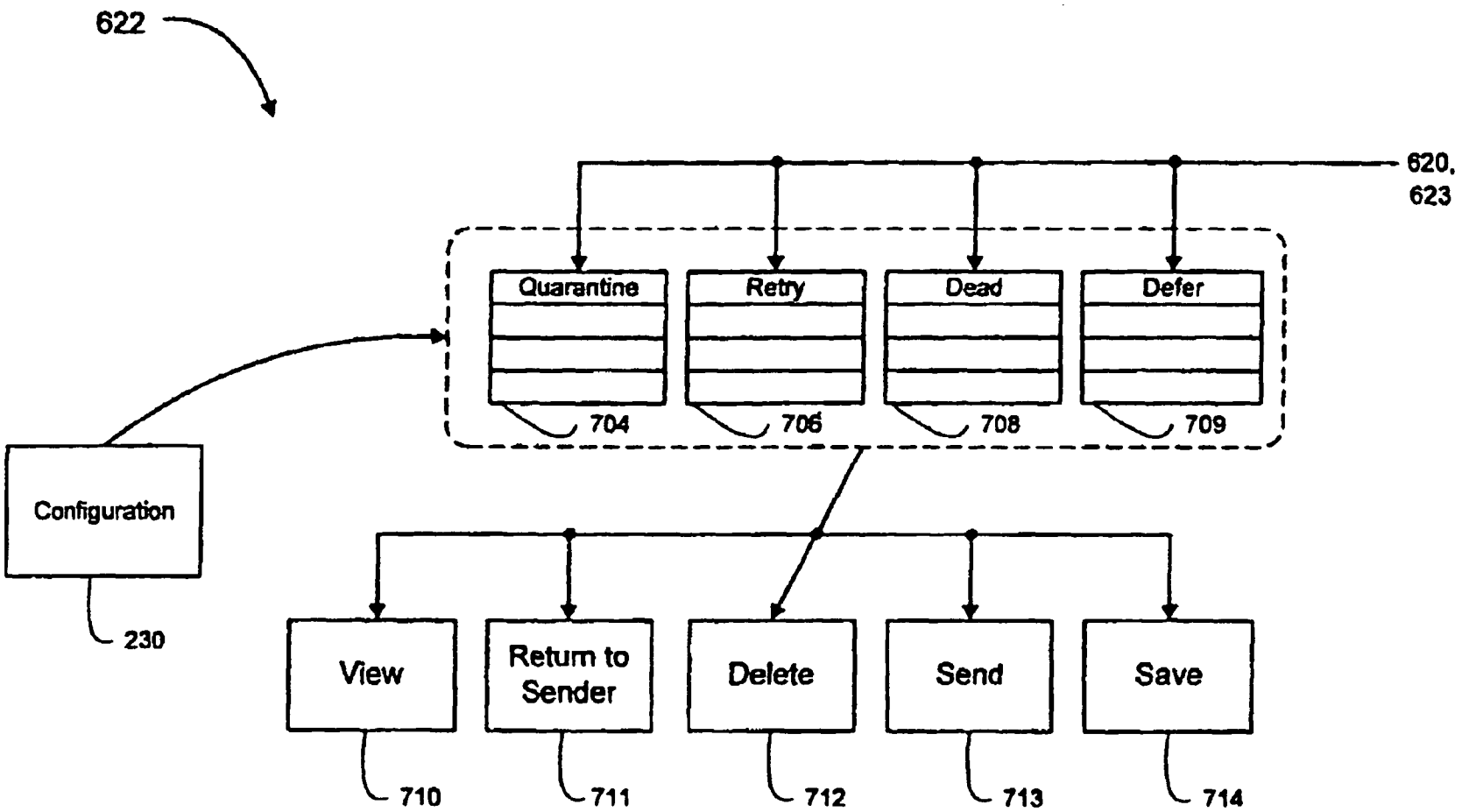
FIG. 7 is a block diagram showing further details of a portion of FIGS. 6(a) and 6(b).

FIG. 7 is a block diagram showing further details of alternative actions 622. Messages received from disposition step 620 are stored in one of the four queues 702, which include quarantine queue 704, retry queue 706, dead letter queue 708, and defer queue 709 depending upon the specified disposition of the message. Quarantine queue 704 stores messages for subsequent retrieval and review by a system administrator or other authorized person. Retry queue 706 stores messages for which delivery has failed. Transmission of messages in the retry queue 706 is subsequently re-attempted. Dead letter queue 708 stores messages which continue to be undeliverable after several retries and which cannot be returned to the sender. Messages in the dead letter queue 708 may be acted upon by a system administrator. Defer queue 709 stores messages to be delivered automatically at a later time, for example an off-peak-time such as a weekend or night time. Configuration module 230 provides a plurality of actions 710-714 which may be performed on the messages in queue 702. The messages can be viewed 710 by the administrator, returned to the sender 711, deleted 712, sent to the specified destination(s) 713 and/or saved 714.

It is to be understood that the specific mechanisms and techniques which have been described are merely illustrative of one application of the principals of the invention. Numerous modifications may be made to the methods and apparatus described without departing from the true spirit and scope of the invention.

What is claimed is:

[1. A method for filtering e-mail messages transmitted from an external site to an internal site associated with a first policy, comprising:

i. intercepting a plurality of data packets associated with an e-mail message having a sender address associated with an external site;

ii. assembling said data packets to an application level message;

iii. detecting whether the application level message includes a digital signature attachment;

iv. applying at least one policy condition to said application level e-mail message, said policy condition applied by reference to said attached digital signature, said applying providing a policy application result;

v. applying at least a second policy condition to said application level e-mail message in response to a predetermined condition of the attached digital signature, the second policy condition selected by reference to an identity associated with the valid digital signature;

vi. detecting that the digital signature is a valid digital signature; and vii. processing said application level e-mail message in accordance with said applying at least a second policy condition.]

[2. A method for filtering e-mail messages transmitted from an external site to an internal site associated with a first policy, comprising:

i. intercepting a plurality of data packets associated with an e-mail message having a sender address associated with an external site;

ii. assembling said data packets to an application level message;

iii. detecting whether the application level message includes a digital signature attachment;

iv. applying at least one policy condition to said application level e-mail message, said policy condition applied by reference to said attached digital signature, said applying providing a policy application result;

v. applying a second policy for detecting whether the attached signature is associated with a domain which is included in a stored list of trusted domains; and vi. processing said application level e-mail message in accordance with said applying at least a second policy condition.]

*3. A method for filtering e-mail messages transmitted from an external site to an internal site associated with a first policy, comprising:*

*intercepting, at an SMTP relay implemented as programmed computer hardware separate and distinct from a packet inspection-type access firewall, a plurality of data packets associated with an e-mail message having a sender address associated with an external site;*

*assembling said data packets to an application level e-mail message;*

*detecting whether the application level e-mail message includes a digital signature attachment;*

*applying at least a first policy condition to said application level e-mail message, said first policy condition applied by reference to said attached digital signature, said applying providing a policy application result;*

*applying at least a second policy condition to said application level e-mail message in response to a predetermined condition of the attached digital signature, the second policy condition selected by reference to an identity associated with the valid digital signature;*

*detecting that the digital signature is a valid digital signature;*

*processing said application level e-mail message in accordance with said applying at least a second policy condition, and*

*responsive to the interception at the SMTP relay, building a list of sender policies corresponding to the sender address of the application level e-mail message and building a list of recipient policies corresponding to one or more recipient addresses of the application level e-mail message;*

*the applied first and second policy conditions being respectively selected from one of the lists of sender and recipient policies for the application level e-mail message,*

*wherein different types of the sender and recipient policies are applied to the application level e-mail message in a predetermined priority order in which access management policies are applied after decryption policies and before remaining content control policies, formal conversion policies and security policies, wherein the security policies include at least client security usage, preserve encryption and plain text access policies.*

*4. The method of claim 3, further comprising:*

*decrypting said application level e-mail message prior to said applying at least a second policy condition.*

*5. The method of claim 3, further comprising:*

*at the SMTP relay, filtering said application level e-mail message in accord with an administrator selectable set of access control-type, content-type, virus-type and security-type policy conditions,*

*wherein the access control-type, content-type, virus-type and security-type policy conditions are specified as a collection of administrator selectable criteria, exceptions to said criteria, and actions.*

*6. The method of claim 3,*

*wherein the processing includes encrypting the application level e-mail message and forwarding the encrypted application level e-mail message to a recipient thereof.*

*7. A method for filtering e-mail messages transmitted from an external site to an internal site associated with a first policy, comprising:*

*intercepting at an SMTP relay implemented as programmed computer hardware separate and distinct from a packet inspection-type access firewall, a plurality of data packets associated with an e-mail message having a sender address associated with an external site;*

*assembling said data packets to an application level e-mail message;*

*detecting whether the application level e-mail message includes a digital signature attachment;*

*applying at least a first policy condition to said application level e-mail message, said first policy condition applied by reference to said attached digital signature, said applying providing a policy application result;*

*applying at least a second policy condition for detecting whether the attached signature is associated with a domain which is included in a stored list of trusted domains;*

*processing said application level e-mail message in accordance with said applying at least a second policy condition; and*

*responsive to the interception at the SMTP relay, building a list of sender policies corresponding to the sender address of the application level e-mail message and building a list of recipient policies corresponding to one or more recipient addresses of the application level e-mail message;*

*the applied first and second policy conditions being respectively selected from one, of the lists of sender and recipient policies for the application level e-mail message,*

*wherein different types of the sender and recipient policies are applied to the application level e-mail message in a predetermined priority order in which access management policies are applied after decryption policies and before remaining content control policies, formal conversion policies and security policies, wherein the security policies include at least client security usage, preserve encryption and plain text access policies.*

*8. The method of claim 7, further comprising:*

*decrypting said application level e-mail message prior to applying at least a second policy condition.*

*9. The method of claim 7, further comprising:*

*at the SMTP relay, filtering said application level e-mail message in accord with an administrator selectable set of access control-type, content-type, virus-type and security-type policy conditions,*

*wherein the access control-type, content-type, virus-type and security-type policy conditions are specified as a collection of administrator selectable criteria, exceptions to said criteria, and actions.*

*10. The method of claim 7,*

*wherein the processing includes encrypting the application level e-mail message and forwarding the encrypted application level e-mail message to a recipient thereof.*

* * * * *

UNITED STATES PATENT AND TRADEMARK OFFICE

CERTIFICATE OF CORRECTION

PATENT NO. : RE43,302 E
APPLICATION NO. : 11/807953
DATED : April 3, 2012
INVENTOR(S) : Robert D. Dickinson, III and Sathvik Krishnamurthy It is certified that error appears in the above-identified patent and that said Letters Patent is hereby corrected as shown below:

Column 12, Claim 3, line 52 change “formal” to --format--.

Signed and Sealed this
Seventh Day of August, 2012

David J. Kappos

David J. Kappos
*Director of the United States Patent and Trademark Office*